United States Patent [19]
Rothwell, Jr. et al.

[11] Patent Number: 6,130,511
[45] Date of Patent: Oct. 10, 2000

[54] NEON DISCHARGE LAMP FOR GENERATING AMBER LIGHT

[75] Inventors: Harold L. Rothwell, Jr., Hopkinton, N.H.; Thomas E. Peters, Chelmsford, Mass.; Jean M. Evans, North Hampton, N.H.; Anthony F. Kasenga, Towanda, Pa.

[73] Assignee: Osram Sylvania Inc., Danvers, Mass.

[21] Appl. No.: 09/162,191

[22] Filed: Sep. 28, 1998

[51] Int. Cl.$^7$ ....................................................... H01J 1/62
[52] U.S. Cl. ......................... 315/246; 315/326; 313/485; 313/487
[58] Field of Search ..................... 313/485, 487, 313/491, 631, 636, 642, 643; 315/244, 246, 326, DIG. 2

[56] References Cited

U.S. PATENT DOCUMENTS

| | | | |
|---|---|---|---|
| 5,523,655 | 6/1996 | Jennato et al. | 315/246 |
| 5,714,836 | 2/1998 | Hunt et al. | 313/487 |
| 5,801,483 | 9/1998 | Watanabe et al. | 313/485 |
| 5,965,988 | 10/1999 | Vollkommer et al. | 315/246 |

FOREIGN PATENT DOCUMENTS

| | | | |
|---|---|---|---|
| 0 779769 | 6/1997 | European Pat. Off. | H05B 41/30 |

OTHER PUBLICATIONS

Holloway et al., Optical Properties of Cerium–Activated Garnet Crystals, J. Optical Society of America, 59(1), 60–63, (1969).

Robertson et al., Colourshift of the Ce$^{3+}$ Emission in Monocrystalline Epitaxially Grown Garnet Layers, Philips J. Res., 36, 15–30, (1981).

1 Abstract, Proceedings of 8th International Symposium on the Science of Light and Technology of Light Sources (Aug. 30 –Sep., 1998).

Primary Examiner—Don Wong
Assistant Examiner—Wilson Lee
Attorney, Agent, or Firm—Robert F. Clark

[57] ABSTRACT

A neon gas discharge lamp is provided which produces an acceptable amber color emission for automotive applications. The red emission from the neon discharge when the lamp is operated in a pulsed mode is combined with a green emission from a substituted Y$_3$Al$_{15}$O$_{12}$:Ce phosphor coated on the interior surface of the lamp. The resulting amber emission meets both SAE and ECE amber color requirements. In particular, phosphor has the general formula:

$$Y_{3-(a+b+c)}Ce_aM_bV_cAl_5O_{12}$$

where M is Gd or La;
V are lattice vacanies;
$0.01 \leq a \leq 0.08$;
$0.60 \leq b \leq 2.4$; and
$0 \leq c \leq 0.1$.

23 Claims, 4 Drawing Sheets

NEON DISCHARGE LAMP FOR GENERATING AMBER LIGHT

TECHNICAL FIELD

This invention is related to the field of neon gas discharge lamps. In particular, this invention is related to the use of phosphors to produce amber light from neon gas discharge lamps.

BACKGROUND ART

U.S. Pat. No. 5,523,655 to Jennato et al. which is incorporated herein by reference describes using a neon gas discharge lamp to produce red and amber light for automotive signal lamp applications. The lamp is filled with substantially pure neon at a pressure from 20 to 200 torr. On the interior surface of the lamp envelope, there is a layer containing a phosphor which produces a green emission when stimulated. Red light is produced by operating the discharge with direct current or continuous wave alternating current power. Amber light is generated by switching the power to a pulsed mode. In the pulsed mode, certain states of neon can excite the phosphor by either ultraviolet light emission or collisional contact with the phosphor surface. The green emission from the phosphor combines with the red emission from the neon to generate amber light. By adjusting the duty cycle in the pulsed mode, the lamp can be operated to produce an amber colored light meeting the amber color coordinate requirements for automotive lighting set in the United States by the Society of Automotive Engineers (SAE) and Federal Motor Vehicle Standard 108 and in Europe by the Economic Commission for Europe (ECE). A $Y_3Al_5O_{12}$:Ce phosphor (Sylvania Type 251) is the preferred green emitting phosphor used by Jennato et al. This phosphor fluoresces with a broad emission band around 550 nm. This emission band extends below 500 nm on the blue side and above 650 nm on the red side. The combination of the green emission from this phosphor and the red emission from the neon gas produce an amber light which is acceptable for automotive applications in the United States. However, because the emission from the $Y_3Al_{15}O_{12}$:Ce phosphor extends below 500 nm, it is difficult to obtain an amber color within the narrower range of chromaticity values required by the ECE for European automotive lighting. Thus, it would be an advantage to provide a $Y_3Al_{15}O_{12}$:Ce phosphor which in combination with the red neon emission would produce more readily an acceptable amber light for European automotive applications.

SUMMARY OF THE INVENTION

It is an object of the invention to obviate the disadvantages of the prior art.

It is another object of the invention to provide a gas discharge lamp for generating amber light and, more particularly, a gas discharge lamp which can produce red and amber light which complies with SAE and ECE automotive requirements.

It is a further object of the invention to provide a method of operating a gas discharge lamp in a manner to produce an amber light.

In accordance with one object of the invention, there is provided a rare gas discharge lamp for generating amber light, the lamp having an envelope formed of a light transmissive material, the envelope having a wall defining an enclosed volume, a first electrode extending through the wall to contact the enclosed volume, a second electrode extending through the wall to contact the enclosed volume, the electrodes being sufficiently separated for producing a discharge therebetween, a neon gas fill contained within the enclosed volume, a pulse generator connected to the first and second electrodes for forming a discharge to electrically stimulate the neon gas fill; and a phosphor coating enclosed in the envelope, the phosphor coating comprising a phosphor formulated according to a general formula:

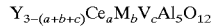

where M is Gd or La;
V are lattice vacanies;
$0.01 \leq a \leq 0.08$;
$0.60 \leq b \leq 2.4$; and
$0 \leq c \leq 0.1$.

In accordance with another object, there is provided a method for producing amber light, the method involving stimulating neon gas to emit ultraviolet light and red light in the presence of a green emitting phosphor, the ultraviolet light causing the emission of green light from the phosphor, the green and red light combining to form an amber light, and the phosphor comprising a gadolinium or lanthanum substituted cerium activated yttrium aluminum garnet.

DESCRIPTION OF THE PREFERRED EMBODIMENTS

For a better understanding of the present invention, together with other and further objects, advantages and capabilities thereof, reference is made to the following disclosure and appended claims taken in conjunction with the above-described drawings.

Replacing some of the yttrium in a cerium activated yttrium aluminum garnet, $Y_3Al_5O_{12}$:Ce, phosphor with a larger ion such as gadolinium, $Gd^{3+}$, or lanthanum, $La^{3+}$, causes a reduction in the phosphor's blue emission band. As a result of the reduced blue emission, an amber emission can be generated by neon gas discharge lamps which complies readily with the stricter requirements for European automotive applications. In particular, the phosphor is formulated according to the general formula:

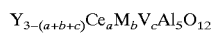

where M is Gd or La;
V are lattice vacanies;
$0.01 \leq a \leq 0.08$;
$0.60 \leq b \leq 2.4$; and
$0 \leq c \leq 0.1$ Preferably, the phosphor is formulated to contain vacancies (i.e., cation deficient) in order to promote the substitution of the larger ions into yttrium sites in the lattice. In a preferred formulation, M is Gd, a=0.037, c=0.07 and 0.75 ≦b ≦1.5. In a more preferred formulation, M is Gd, a=0.037, c=0.07 and b=1.5.

The phosphor is made by conventional phosphor manufacturing techniques. For the preferred formulations, stoichiometric amounts of yttrium oxide, $Y_2O_3$, gadolinium oxide, $Gd_2O_3$, cerium oxide, $CeO_2$, and aluminum hydroxide, $Al(OH)_3$ are combined, blended, and fired in alumina crucibles at 1650° C. for 6 hours in air. The fired cakes are pulverized to a fine powder and screened to −100 mesh. The screened material is re-blended and fired at 1650° C. for an additional 3.5 hours in a 75%$H_2$/25%$N_2$ atmosphere to form the phosphor. After the second firing, the fired cakes are pulverized and sieved to −400 mesh to yield the finished phosphor. The finished phosphor is suspended in an aqueous coating media and applied to the interior surface of the lamp.

Figure 1:
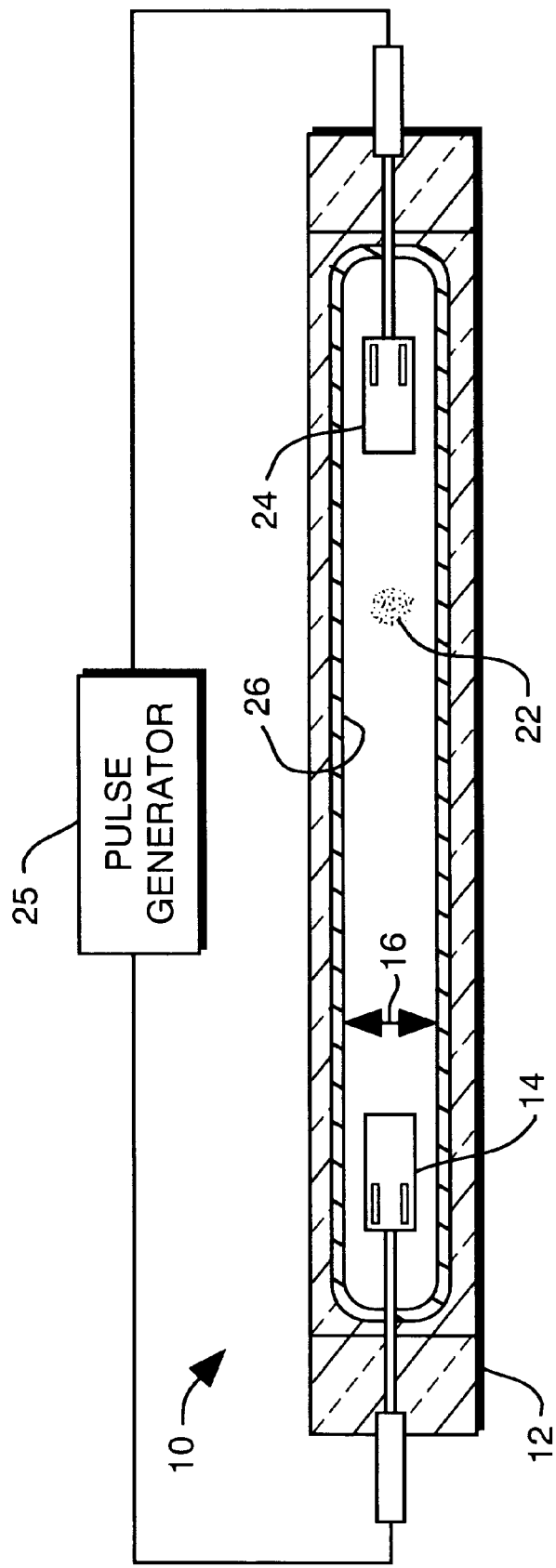
FIG. 1 is shows a view, partially broken away, of a preferred embodiment of a neon automotive signal lamp operated by a pulse generator.

FIG. 1 shows a preferred embodiment of a neon fluorescent lamp, partially broken away. The neon signal lamp 10 for a vehicle is assembled from a tubular envelope 12, a first electrode 14, a neon gas fill 22, a second electrode 24, and a phosphor coating 26. The lamp is operated by a pulse generator The tubular envelope 12 may be made out of hard glass or quartz to have the general form of an elongated tube. The preferred glass does not devitrify, or outgas at the temperature of operation, and also substantially blocks the loss of neon. One suitable glass is an alumina silicate glass, a "hard glass," available from Corning Glass Works, and known as type 1724. The 1724 glass may be baked at 900 degrees Celsius to drive out water and hydrocarbons. The hot bake out improves the cleanliness that helps standardize the color produced, and improves lamp life.

The inside diameter 16 of envelope 12 may vary from 2.0 to 10.0 millimeters, with the preferred inside diameter 16 being about 3.0 to 5.0 millimeters. Tubular envelopes have been made with overall lengths from 12.7 centimeters to 127 centimeters (5 to 50 inches). The overall length is thought to be a matter of designer choice.

At one end of the tubular envelope 12 is a first sealed end. The first sealed end entrains the first electrode 14. The preferred first sealed end is a press seal capturing the first electrode 14 in the hard glass envelope. Positioned at the opposite end of the tubular envelope 12 is a second sealed end. The second sealed end may be formed to have substantially the same structure as the first seal, capturing a similarly formed second electrode 24.

Electrode efficiency, and electrode durability are important to overall lamp performance. The preferred electrode is a cold cathode type with a material design that is expected to operate at a high temperature for a long lamp life. A molybdenum rod type electrode may be formed to project into the enclosed envelope volume, with a cup positioned and supported around the inner end of the electrode rod. The cup may be formed from nickel rolled in the shape of a cylinder. The cup may be attached by crimping or welding the metal tube to the electrode rod.

The region between the electrode tip and the inner wall of the cup may be coated or filled with an electrically conductive material that preferably has a lower work function than does the cup. The fill material is preferably an emitter composition having a low work function, and may also be a getter. The preferred emitter is an aluminum and zirconium getter material, known as Sylvania 8488 that is spun deposited and baked on to provide an even coating. The cup surrounds the emitter tip, and extends slightly farther, perhaps 2.0 millimeters, into the tubular envelope than the inner most part of the electrode rod, and the emitter material extend. Emitter material, or electrode material that might sputter from the emitter tip tends to be contained in the extended cup.

The preferred rare gas fill 22 is substantially pure, research quality neon. The gas fill 22 pressure affects the color output of the lamp. Increasing pressure shortens the time between atomic collisions, and thereby shifts the population of emitting neon species to a deeper red. By adjusting the pressure, one can then affect the lamp color. At pressures below 10 torr, the chromaticity is outside the SAE red range. At 70 torr the neon gives an SAE acceptable red with CIE x,y chromaticity figures of (0.662, 0.326). At 220 torr, the color still meets the SAE requirements, but has shifted to a deeper red with CIE x,y coordinates of (0.670, 0.324). With decreasing pressure the emitted light tends to be orange.

The neon gas fill 22 may have a preferred pressure from 20 torr to 220 torr. At pressures of 10 torr or less, the electrodes tend to sputter, discoloring the lamp, reducing functional output intensity, and threatening to crack the lamp by interacting the sputtered metal with the envelope wall. At pressures of 220 torr or more, the ballast must provide a stronger electric field to move the electrons through the neon, and this is less economical. Lamps above 300 torr of neon are felt to be less practical due to the increasing hardware and operating expense. The effect of pressure depends in part on lamp length (arc gap). The preferred pressure for a 30 centimeter (12 inch) lamp is about 100 torr.

The lamp envelope is further coated with phosphor 26, a substituted $Y_3Al_5O_{12}$:Ce, which emits green light in response to the ultraviolet radiation lines of neon. Phosphor 26 may be attached to the interior surface of envelope 12 by known conventional aqueous suspension coating techniques.

The lamp is operated by a pulse generator 25 to give the neon red color, or the combined phosphor and neon colors. The red mode may be accomplished by delivering either direct current or continuous wave alternating current power. To activate the phosphor and form the prescribed color through the mixing of the neon and phosphor emissions, the power is switched to a pulsed mode. In this way, the energetic states of neon can excite the phosphor by either ultraviolet light emission or collisional contact with the phosphor surface. In either case, a short current pulse discharge is necessary. A pulse of less than 3 microseconds is recommended, with pulses of from 1 to 2 microseconds or less being preferred. As pulse duration increases, collisions between atoms, ions and electrons increase, providing additional energy loss mechanisms that may not involve emission in the visible, for example in the infrared.

By adjusting the on period, or the off period, the ultraviolet output of the lamp can be increased or decreased. The effect of adjusting the pulse duration on the excitation of the phosphor is exploited to produce a variable color light source. Color can be varied by shifting the amounts of the phosphor emission and the underlying neon emission. In a completely coated tube, the neon emission that filters through the phosphor coating, and the excited phosphor emission, mix to give the observed color.

The operating lamp voltage is chosen according to the lamp length. The disclosed neon lamps are generally operated at 40 to 70 volts RMS per centimeter of electrode separation, and at about 0.5 to 5.0 milliamps RMS per centimeter of electrode separation. The best value is thought to be about 2.2 milliamps RMS per centimeter of electrode separation. The lamp wattage may range from about 5.0 to about 50.0 watts, with the longer length lamps having the greater wattages.

The method of lamp operation is also relevant to the efficiency of the lamp and the chromaticity of the emitted light. By varying the pulse width, the lamp color due to the rare gas, such as neon emission, can be shifted from a reddish orange to a deep red. To enhance the phosphor generated component of the visible light, the applied pulse voltage should substantially drop to zero between pulses. Where there is a lingering voltage between pulses, the neon continues to be stimulated to emit relatively more red light, and relatively less ultraviolet light, or the energetic states needed to stimulate the phosphor. This decreases the color component produced by the phosphor. As a result, the phosphor coated neon lamp can be operated in a pulsed mode, such as 20 kHz, with a duty cycle of less than three percent, preferably with a zero voltage point. It is understood that pulsed electrical energy can refer to pulsed direct current, chopped continuous wave current, switched high frequency power, or a variety of other forms. It is important only that the electric field pulse (on period) have a rise time sufficient to stimulate the neon atoms into the 3S or 3P orbitals. The pulse should then be followed with an off period, sufficient to allow at least some of the excited neon atoms to decay. The preferred rise time should be greater than $1 \times 10^9$ volts/sec which is comparable to the emission decay rate of neon at about 74 nm. The lamp can then be operated to produce an amber colored light meeting color coordinate requirements set out by the SAE and ECE for automotive lighting. The pulse frequency should be in the range sufficient to establish a nearly completely neutral gas during the off time. The operating voltage may range from 1000 to 10,000 volts or higher depending on the lamp size. Similarly currents may range from 20 milliamps to 1 amp.

The following non-limiting examples are presented.

Three neon gas discharge lamps were prepared. Lamps were made from 3 mm I.D. tubing and filled with 100 torr of neon. One lamp was made using a conventional Sylvania Type 251 $Y_3Al_5O_{12}$:Ce phosphor. The other two lamps were made with gadolinium substituted phosphors. The phosphor formulations are given in Table 1 in terms of the general formula $Y_{3-(a+b+c)}Ce_aGd_bV_cAl_5O_{12}$. Each lamp was 16 inches in length and operated in a pulsed mode as described above using a pulse of about 200 ns at a frequency of about 15 kHz. The CIE chromaticity coordinates were calculated from the emission spectra.

TABLE 1

| Lamp Designation | Phosphor Formulation ($Y_{3-(a+b+c)}Ce_aGd_bV_cAl_5O_{12}$, c = 0.07) | | CIE Chromaticity Coordinates | |
|---|---|---|---|---|
| | a | b | x | y |
| C1 | 0.037 | 0 | 0.582 | 0.406 |
| A2 | 0.037 | 0.75 | 0.591 | 0.402 |
| B1 | 0.037 | 1.5 | 0.597 | 0.398 |

Figure 2:
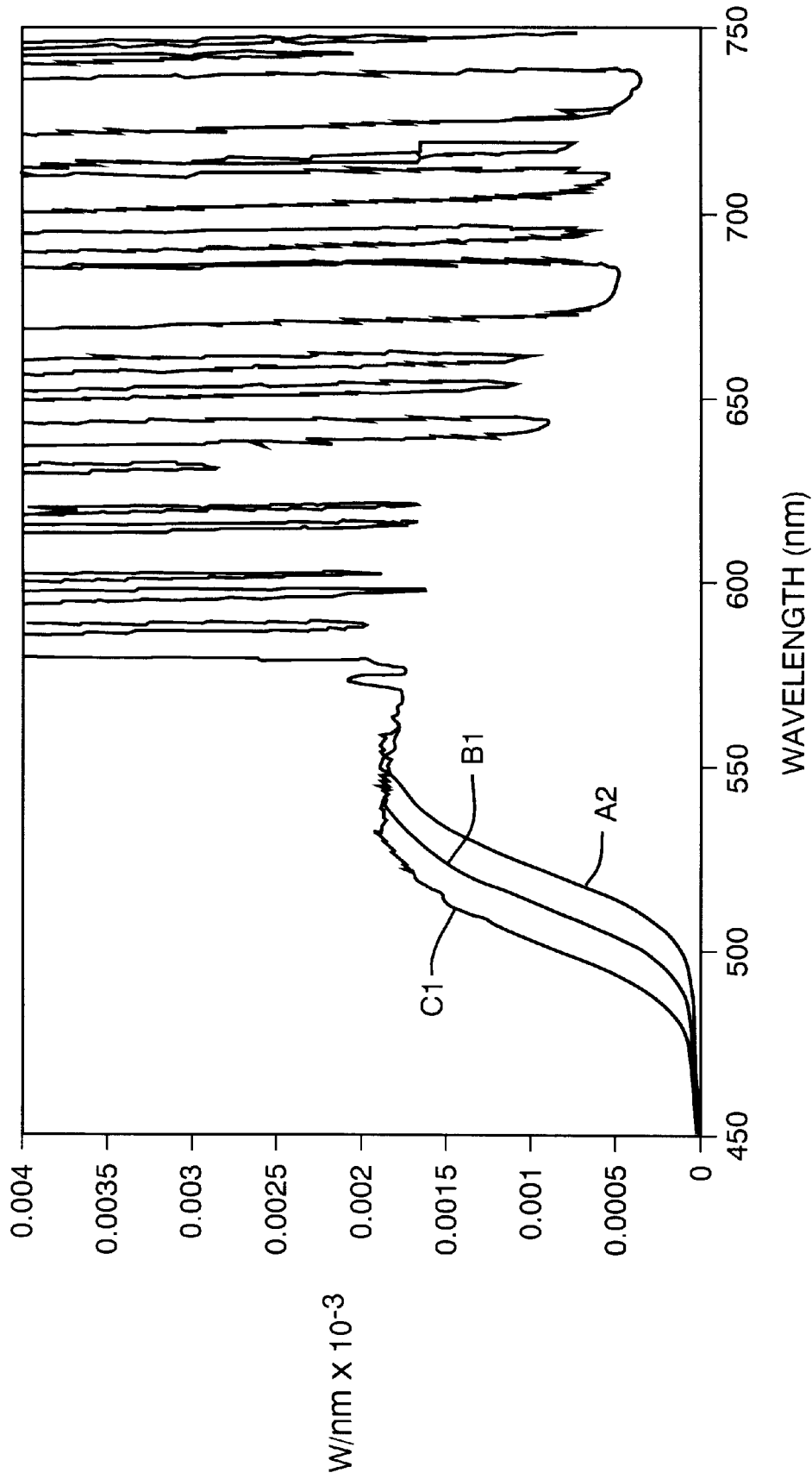
FIG. 2 shows the spectral power distributions of the amber emissions from three neon automotive signal lamps.
Figure 3:
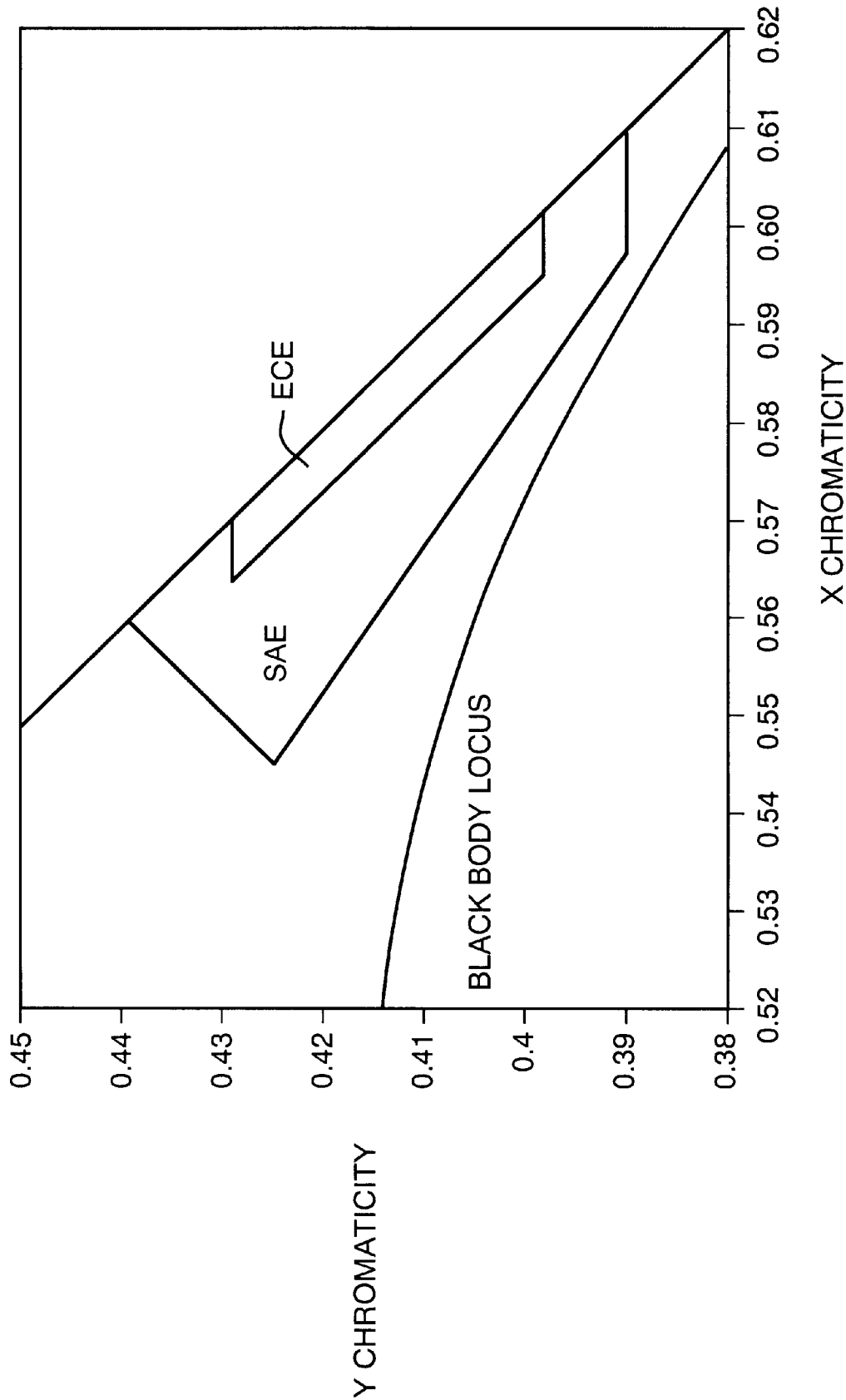
FIG. 3 is a CIE chromaticity diagram displaying the SAE and ECE amber color requirements.
Figure 4:
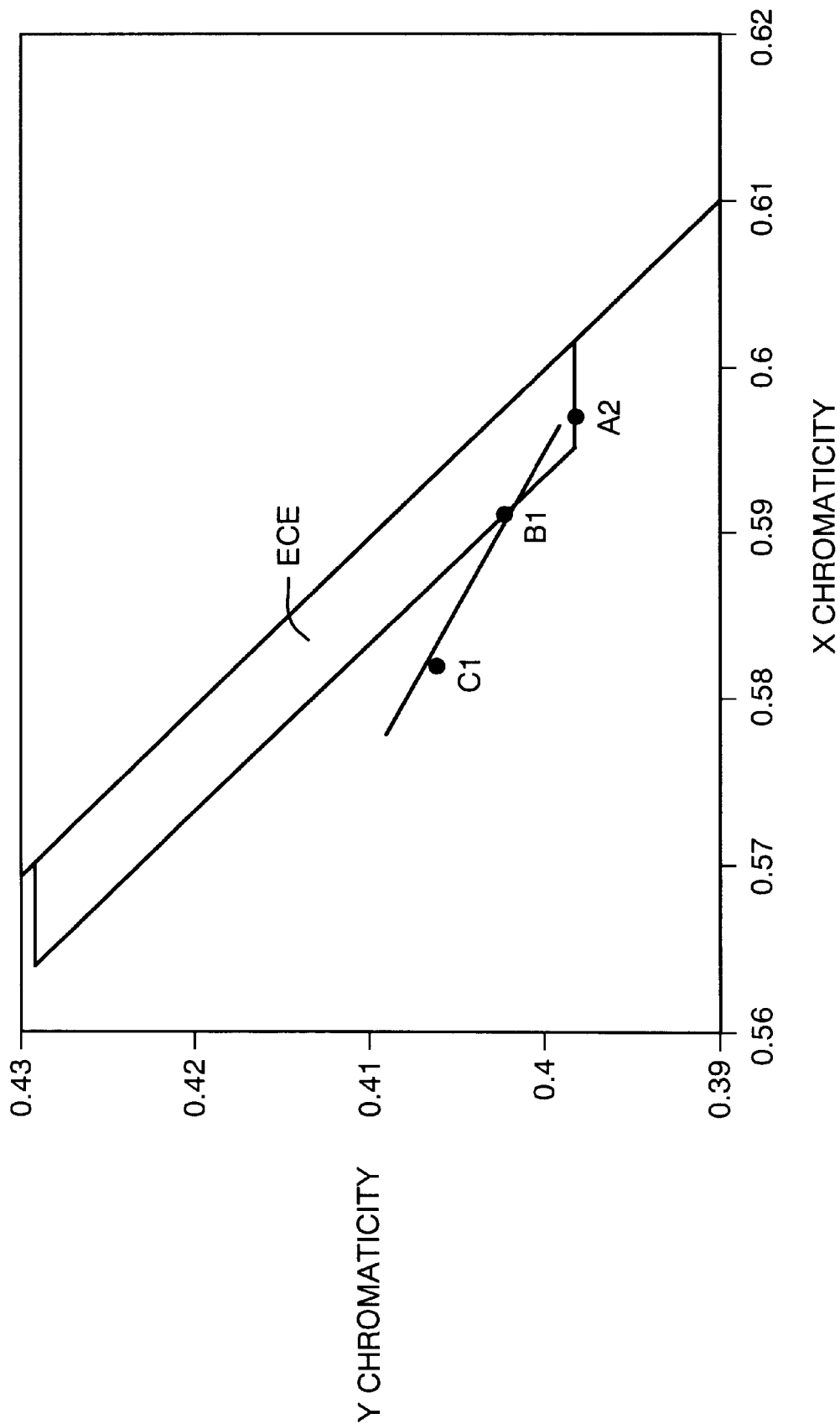
FIG. 4 is a plot of calculated CIE chromaticity values for three neon automotive signal lamps shown in relation to the ECE amber color region.

An expanded view of the visible emission spectra for the three test lamps are shown in FIG. 2. In the 450 to 550 nm region, an approximate 10 nm shift in the edge of the emission band to longer wavelengths is observed for each 0.75 mole Gd substitution per mole phosphor The SAE and ECE amber color requirements are depicted in FIG. 3. As can be seen, the ECE region of chromaticity values is much narrower than, and is contained within, the region of x,y values circumscribed by the SAE. Thus, a light source which meets the ECE requirements will also necessarily meet the SAE requirements. FIG. 4 is a plot of the calculated CIE chromaticity values for the test lamps in relation to the ECE amber color requirements. Both of the lamps made with the gadolinium substituted phosphor (B1 and A2) meet the ECE specification. The standard lamp, C1, made with the conventional Sylvania Type 251 phosphor is outside of the ECE specification but still meets the broader SAE requirement. The line connecting the three points makes it clear that there are a range of values between the 25% Gd substitution (Lamp B1, b=0.75) and the 50% Gd substitution (Lamp A2, b=1.5) wherein the ECE amber color requirements may be met.

While there has been shown and described what are at the present considered the preferred embodiments of the invention, it will be obvious to those skilled in the art that various changes and modifications may be made therein without departing from the scope of the invention as defined by the appended claims.

We claim:

1. A rare gas discharge lamp for generating amber light comprising:

an envelope formed of a light transmissive material, the envelope having a wall defining an enclosed volume, a first electrode extending through the wall to contact the enclosed volume, a second electrode extending through the wall to contact the enclosed volume, the electrodes being sufficiently separated for producing a discharge therebetween, a neon gas fill contained within the enclosed volume, a pulse generator connected to the first and second electrodes for forming a discharge to electrically stimulate the neon gas fill; and a phosphor coating enclosed in the envelope; the phosphor coating comprising a phosphor formulated according to a general formula:

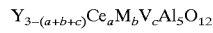

$$Y_{3-(a+b+c)}Ce_aM_bV_cAl_5O_{12}$$

where M is Gd or La;

V are lattice vacancies;

$0.01 \leq a \leq 0.08$;

$0.60 \leq b \leq 2.4$; and $0 \leq c \leq 0.1$.

2. The lamp of claim 1 wherein M is gadolinium, a is 0.037, c is 0.07 and $0.75 \leq b \leq 1.5$.

3. The lamp of claim 2 wherein b is 1.5.

4. The lamp of claim 1 wherein the amber light has a CIE x,y color coordinate within the parallelogram formed by CIE x,y color coordinates (0.564, 0.429), (0.570, 0.429), (0.595, 0.398) and (0.601, 0.398).

5. The lamp of claim 1 wherein the neon gas fill is substantially pure neon having a pressure of from 20 to 220 torr.

6. The lamp of claim 5 wherein the pressure is 100 torr.

7. The lamp of claim 2 wherein the neon gas fill is substantially pure neon having a pressure of from 20 to 220 torr.

8. The lamp of claim 7 wherein the pulse generator is operated using a pulse of about 200 ns at a frequency of about 15 kHz.

9. A method for producing amber light, comprising:

operating a rare gas discharge lamp in a pulsed mode;

the lamp having an envelope formed of a light transmissive material, the envelope having a wall defining an enclosed volume, a first electrode extending through the wall to contact the enclosed volume, a second electrode extending through the wall to contact the enclosed volume, the electrodes being sufficiently separated for producing a discharge therebetween, a neon gas fill contained within the enclosed volume, a pulse generator connected to the first and second electrodes for forming a discharge to electrically stimulate the neon gas fill; and a phosphor coating enclosed in the envelope; the phosphor coating comprising a phosphor formulated according to a general formula:

$$Y_{3-(a+b+c)}Ce_aM_bV_cAl_5O_{12}$$

where M is Gd or La;

V are lattice vacanies;

$0.01 \leq a \leq 0.08$;

$0.60 \leq b \leq 2.4$; and $0 \leq c \leq 0.1$.

10. The method of claim 9 wherein the pulsed mode comprises supplying electrical pulses to the lamp of sufficient voltage, duration and frequency to stimulate the neon gas to emit ultraviolet radiation capable of causing the emission of visible light from the phosphor.

11. The method of claim 10 wherein the neon gas is substantially pure.

12. The method of claim 11 wherein M is gadolinium, a is 0.037, c is 0.07 and $0.75 \leq b \leq 1.5$.

13. The method of claim 12 wherein b is 1.5.

14. The method of claim 12 wherein the neon gas has a pressure of from 20 torr to 220 torr.

15. The method of claim 10 wherein each electrical pulse has a duration of less than 3 microseconds.

16. The method of claim 10 wherein the neon atoms are excited to 3S and 3P orbitals and at least some excited atoms are allowed to decay between electrical pulses.

17. The method of claim 9 wherein the amber light has a CIE x,y color coordinate within the parallelogram formed by CIE x,y color coordinates (0.564, 0.429), (0.570, 0.429), (0.595, 0.398) and (0.601, 0.398).

18. The method of claim 14 wherein the duration is about 200 ns and the frequency is about 15 kHz.

19. A method for producing amber light, comprising: stimulating neon gas to emit ultraviolet light and red light in the presence of a green emitting phosphor, the ultraviolet light causing the emission of green light from the phosphor, the green and red light combining to form an amber light, and the phosphor comprising a gadolinium or lanthanum substituted cerium activated yttrium aluminum garnet.

20. The method of claim 19 wherein the phosphor is formulated according to the general formula:

$$Y_{3-(a+b+c)}Ce_aM_bV_cAl_5O_{12}$$

where M is Gd or La;

V are lattice vacanies;

$0.01 \leq a \leq 0.08$;

$0.60 \leq b \leq 2.4$; and $0 \leq c \leq 0.1$.

21. The method of claim 20 wherein M is gadolinium, a is 0.037, c is 0.07 and $0.75 \leq b \leq 1.5$.

22. The method of claim 21 wherein b is 1.5.

23. The method of claim 19 wherein the amber light has a CIE x,y color coordinate within the parallelogram formed by CIE x,y color coordinates (0.564, 0.429), (0.570, 0.429), (0.595, 0.398) and (0.601, 0.398).

* * * * *